«12» United States Patent
Campbell

«10» Patent No.: US 9,453,123 B2
«45» Date of Patent: Sep. 27, 2016

US009453123B2

«54» RAPID GAS DECOMPRESSION-RESISTANT FLUOROELASTOMER COMPOSITIONS AND MOLDED ARTICLES

«71» Applicant: Greene, Tweed of Delaware, Inc., Wilmington, DE (US)

«72» Inventor: Ronald R Campbell, Harleysville, PA (US)

«73» Assignee: Greene, Tweed Technologies, Inc., Wilmington, DE (US)

«*» Notice: Subject to any disclaimer, the term of this patent is extended or adjusted under 35 U.S.C. 154(b) by 0 days.

«21» Appl. No.: 13/759,028

«22» Filed: Feb. 4, 2013

«65» Prior Publication Data

US 2013/0202838 A1    Aug. 8, 2013

Related U.S. Application Data

«60» Provisional application No. 61/594,999, filed on Feb. 3, 2012.

«51» Int. Cl.
| | |
|---|---|
| *C08L 27/16* | (2006.01) |
| *C08L 27/20* | (2006.01) |
| *C08L 27/22* | (2006.01) |
| *C08K 5/13* | (2006.01) |
| *C08K 5/14* | (2006.01) |
| *C08K 5/3492* | (2006.01) |
| *C08J 3/24* | (2006.01) |
| *C08K 3/04* | (2006.01) |
| *C08K 3/22* | (2006.01) |

«52» U.S. Cl.
CPC ............... *C08L 27/22* (2013.01); *C08J 3/243* (2013.01); *C08K 3/04* (2013.01); *C08K 3/22* (2013.01); *C08K 5/13* (2013.01); *C08K 5/14* (2013.01); *C08K 5/3492* (2013.01); *C08J 2327/12* (2013.01); *Y10T 428/215* (2015.01)

«58» Field of Classification Search
USPC .................................. 524/545, 546; 428/66.4
See application file for complete search history.

«56» References Cited

U.S. PATENT DOCUMENTS

| | | | |
|---|---|---|---|
| 4,530,971 A | 7/1985 | Geri et al. | |
| 5,153,272 A | 10/1992 | Chiodini et al. | |
| 5,677,389 A | 10/1997 | Logothetis et al. | |
| 6,001,944 A * | 12/1999 | Cumming et al. ............... | 528/24 |
| 6,326,436 B2 * | 12/2001 | Bowers ........................ | 525/248 |
| 7,098,270 B2 | 8/2006 | Hochgesang et al. | |
| 7,247,749 B2 | 7/2007 | Aufdermarsh et al. | |
| 7,309,743 B2 | 12/2007 | Kawasaki et al. | |
| 7,514,506 B2 | 4/2009 | Mansfield et al. | |
| 7,521,510 B2 | 4/2009 | Aufdermarsh et al. | |
| 7,592,386 B2 | 9/2009 | Grootaert et al. | |
| RE41,110 E | 2/2010 | Araki et al. | |
| 7,659,347 B2 | 2/2010 | Washino et al. | |
| 2005/0070637 A1 * | 3/2005 | Nishibayashi et al. ......... | 524/80 |
| 2006/0058448 A1 | 3/2006 | Higashino et al. | |
| 2006/0142467 A1 * | 6/2006 | Park .............................. | 524/495 |
| 2006/0192280 A1 * | 8/2006 | Esler et al. ................... | 257/701 |
| 2006/0287438 A1 * | 12/2006 | Mansfield ............. | C08F 214/18 525/326.2 |
| 2007/0135577 A1 | 6/2007 | Shefelbine et al. | |
| 2008/0207861 A1 * | 8/2008 | Bauerle et al. ............... | 526/247 |
| 2009/0301712 A1 | 12/2009 | Campbell | |
| 2011/0009568 A1 | 1/2011 | Okazaki et al. | |
| 2011/0230670 A1 | 9/2011 | Manzara et al. | |
| 2011/0263795 A1 | 10/2011 | Washino et al. | |
| 2012/0100379 A1 * | 4/2012 | Luo et al. ..................... | 428/421 |

FOREIGN PATENT DOCUMENTS

| | | |
|---|---|---|
| EP | 211431 A2 * | 2/1987 |
| EP | 0211431 A2 | 2/1987 |
| EP | 0570159 | 11/1993 |
| EP | 570159 A1 * | 11/1993 |
| EP | 939785 B1 * | 4/2003 |
| EP | 2105465 | 9/2009 |
| EP | 2105465 A1 * | 9/2009 |
| GB | 2461775 A * | 1/2010 |
| WO | 2005/097890 | 10/2005 |
| WO | WO-2005/097890 A2 * | 10/2005 |
| WO | 2012/054685 | 4/2012 |
| WO | WO-2012/054685 A2 * | 4/2012 |
| WO | WO-2013/116868 A1 * | 8/2013 |

OTHER PUBLICATIONS

Cabot, Vulcan® 9 carbon black Datasheet, (2001)—2 pages.
Natrochem, Inc., TAIC DLC®-A Data Sheet, (2003)—1 page.
Solvay Solexis S.p.A., Technoflon®PL958 Datasheet, (2003)—7 pages.
Horsehead Corporation, Kadox®720 Datasheet, (2007)—1 page.
Struktol Company of America, Struktol®WS 180 and 280 Technical Datasheet (2009)—2 pages.

(Continued)

*Primary Examiner* — Peter D Mulcahy
*Assistant Examiner* — Henry Hu
«74» *Attorney, Agent, or Firm* — Flaster/Greenberg PC

«57» ABSTRACT

The disclosure herein includes rapid gas decompression (RGD)-resistant fluoroelastomeric compositions and includes a curable fluoropolymer having a curesite monomer with at least one functional group capable of curing with a peroxide curative. The compositions include a bisphenyl-based curative and an organic peroxide curative and an organic peroxide co-curative. The fluoroelastomeric compositions have a ratio of the bisphenyl-based curative to the organic peroxide co-curative of about 0.25:1 to about 1.5:1 and a ratio of the bisphenyl-based curative to the organic peroxide of about 0.5:1 to about 1.5:1. Such compositions can be formed into seals meeting RGD industry standards in a variety of sizes, up to and/or exceeding 5 mm in thickness or cross-sectional diameter.

25 Claims, No Drawings

(56) References Cited

OTHER PUBLICATIONS

Cancarb, Thermax® Floform N990 Ultra-Pure Medium Thermal Carbon Black Datasheet—1 page.

Ho, E. "Elastomeric Seals for Rapid Gas Decompression Applications in high-Pressure Services," BHR Group Limited for the Health and Safety Executive, Research Report No. 485, pp. 36 (2006)—74 pages.

Dupont: "Dupont Viton GFLT-600s", Jul. 2, 2010—12 pages.

Dupont: "Dupont Viton Extreme ETP-600S", Jul. 2, 2010—6 pages.

International Search Report and Written Opinion for PCT/US2013/024678, mailed Apr. 12, 2013—12 pages.

International Preliminary Report on Patentability for PCT/US2013/024678, mailed Aug. 5, 2014—6 pages.

Extended European Search Report for European Patent Application No. 13744120.0, mailed Sep. 4, 2015—9 pages.

\* cited by examiner

RAPID GAS DECOMPRESSION-RESISTANT FLUOROELASTOMER COMPOSITIONS AND MOLDED ARTICLES

CROSS-REFERENCE TO RELATED APPLICATIONS

This application claims the benefit under 35 U.S.C. §119 (e) of U.S. Provisional Patent Application No. 61/594,999, filed Feb. 3, 2012, the entire disclosure of which is incorporated herein by reference.

BACKGROUND OF THE INVENTION

1. Field of the Invention

The invention relates to compositions and molded articles for formation of articles resistant to rapid gas decompression and resultant cracking and rupture.

2. Description of Related Art

Rapid gas decompression (RGD), also known as explosive decompression (ED) often occurs when high-pressure gas molecules migrate into an elastomer at a compressed state. When the pressure surrounding the elastomer is released suddenly, the compressed gas inside the elastomer tries to expand and exit the elastomer. This gas expansion can cause seal damage such as tears, holes, blisters and cracks.

Rapid gas decompression (RGD) resistant fluorocarbon elastomers are known and widely used in seals and gaskets, etc. and in end use sealing applications such as compressors and down hole applications in the oil industry where seals and other articles formed of such elastomers can encounter long soak times in high pressure gases such as carbon dioxide and methane. Leaks and excessive cracking in such applications can lead to unnecessary downtime associated with unforeseen maintenance. Unplanned maintenance can cause not only significant production time, but financial loss and additional potential incidents where safety hazards to workers may occur.

Standards such as NORSOK M710 and ISO 23936-2: 2011(E), each is incorporated herein by reference, have been written to serve as an industry benchmarks for RGD resistance and to evaluate the performance of seals in rapid gas decompression environments. The NORSOK M-710 standard (Qualification of Nonmetallic Sealing Materials and Manufacturers) was introduced by the Norwegian petroleum industry to define the requirements for critical nonmetallic (polymer) sealing applications in conditions where failures can be costly from a safety and financial standpoint. The NORSOK M-710's criteria were developed to ensure safe and cost-effective solutions for sealing in the oil and gas industry. Similarly, the ISO rating is from the International Standards Organization. ISO 23936 provides principles, requirements and recommendations for selecting and qualifying polymer/elastomer materials for service in oil and gas production environments in typical equipment used in those industries. These standards are created to avoid failure of such materials in service which can present a risk to the health and safety or to the environment as well as losses in production to manufacturers.

The lower the rating number achieved when measuring seals performance under these standards, the lower the cracking under the standard test conditions and the higher the resistance of the material to RGD. For example, an ISO rating of 0 to 3 is considered passing for RGD use, wherein 0 indicates no cracks, holes or blisters and exposed surfaces remain intact after ISO exposure testing and a rating of 3 on the lower end of passing represents that there may be a number of cracks of which two internal cracks can each have a length of 50% to 80% of the cross sectional diameter of the test seal piece and a total crack length may not exceed three times the cross sectional diameter of the test seal piece. Further external cracks must be <50% of the cross sectional diameter of the test seal piece with no splits being permitted.

Whether seals and other elastomeric components suffer from RGD in terms of cracking or deterioration and pass or fail such industry standards is a function of working environment (exposure to harsh materials, pressure or temperature) and material of construction. While the former is difficult to alter in a given end use, the material may be modified in the art to create better products. Factors which affect the material in an RGD use include its formulation, manufacturing, size and contamination resistance among other factors. Continued exposure to high temperatures, fast depressurization rates and numerous cycling can impact the severity of damage to RGD-resistant materials, and consequently, how long they last in use and their tendency to require emergency replacement should a seal or other component rupture or breakdown in use.

In addition to making sealing and other elastomeric components more RGD-resistant, it is also a goal in the art to try to maintain generally good elastomeric properties such as good processability, low shrinkage and, in some applications, lower hardness.

RGD-resistant seals are known in the art. One such seal is commercially available from Greene, Tweed & Co., Inc. of Kulpsville, Pa. as FKM 938. This material satisfies a passing rating under the ISO standard, typically achieving ISO ratings of 1 or 2 depending on end use. Similarly, E. I. DuPont de Nemours offers RGD-resistant compounds including those commercially available based on Viton® Extreme™ ETP-S and Viton® GF-S which are promoted as having its best ED performance in a 100% carbon dioxide environment and as satisfying a passing rating of 0-3 in compressed and uncompressed states.

Another problem encountered in the art, besides continuing to improve the RGD resistance and cracking issues when a seal or other component is placed in service, includes the need to increase the size of the parts exposed to such environments for variety in component design without losing RGD resistance. It is known in the art that smaller seals can perform well over a range of decompression conditions if otherwise identified as passing. However, when cross sectional diameters become greater than about 5.33 mm, and as they approach 10 mm or even greater, then can begin to perform generally badly, even if one is using an RGD-resistant elastomer material. Thus, when larger seals are needed, it has been the case that one needs to redesign an end application to use a smaller seal, or must move to a different material such as a sprung PTFE seal. See, E. Ho, "Elastomeric Seals For Rapid Gas Decompression Applications in High-Pressure Services," BHR Group Limited for the Health and Safety Executive, Research Report No. 485, pp. 36 (2006).

While such compounds are available, there is still a need in the art to continue to improve RGD-resistance in harsh environments, as such environments become more demanding, and to remain RGD resistant for longer periods of time and/or under harsher conditions. Further, it would be advantageous if larger sized seals could be formed from such materials without losing RGD resistance. Therefore, a need in the art exists for a composition that can repeatedly satisfy the industry standards, while having high passing ratings when in service to improve service life, reduce maintenance downtime in production, and to protect worker safety as well as the environment.

BRIEF SUMMARY OF THE INVENTION

The present invention provides a curable rapid gas decompression-resistant fluoroelastomeric composition, comprising a curable fluoropolymer comprising a curesite monomer having at least one functional group capable of curing with a peroxide curative; a bisphenyl-based curative; and an organic peroxide curative and an organic peroxide co-curative, wherein the fluoroelastomeric composition has a ratio of the bisphenyl-based curative to the organic peroxide co-curative of about 0.25:1 to about 1.5:1 and a ratio of the bisphenyl-based curative to the organic peroxide of about 0.5:1 to about 1.5:1.

In one embodiment, the curable fluoropolymer preferably comprises vinylidene fluoride as a monomer. The bisphenyl-based curative preferably comprises Bisphenol A (4,4'-(propane-2,2-diyl)diphenol), Bisphenol AF (4-[1,1,1,3,3,3-Hexafluoro-2-(4-hydroxyphenyl)propan-2-yl]phenol), bisaminophenol (BOAP) (2,2-Bis(3-amino-4-hydroxyphenyl)hexafluoropropane) and similar compounds as discussed further herein, and the organic peroxide co-curative is preferably an allyl compound, such as triallylisocyanurate and similar compounds. In a preferred embodiment, the ratio of the bisphenyl-based curative to the organic peroxide co-curative is about 1:1.5 to about 1.5:1 and/or the ratio of the bisphenyl-based curative to the organic peroxide is about 1.3:1 to about 2.6:1.

The composition may further comprise at least one compound additive, for example, but not limited to, those selected from the group consisting of at least one carbon black material, at least one zinc oxide compound, and a dispersant, such as, for example, an organosiloxane. The additives preferably comprise no greater than about 80 parts by weight per 100 parts by weight of the curable fluoropolymer.

In a further preferred embodiment, the composition comprises a base of 100 parts by weight of the curable fluoropolymer and, based on the 100 parts by weight of the curable fluoropolymer the following components: about 1.5 to about 3 parts by weight of the bisphenyl-based curative; about 2 to about 5 parts by weight of the organic peroxide curative; about 3 to about 6 parts by weight of the organic peroxide co-curative; up to about 60 parts by weight of at least one carbon black material; up to about 15 parts by weight of a zinc oxide compound; and up to about 3 parts by weight of a dispersant. In yet a more preferred embodiment, there is about 2.3 to about 4.6 of the organic peroxide curative; about 20 to about 60 parts by weight of a blend of at least one first carbon black material and at least one second carbon black material; about 3 to about 5 parts by weight of the zinc oxide compound; and about 0.5 to 1.0 parts by weight of the dispersant, each based on 100 parts by weight of the base curable fluoropolymer. In an embodiment including at least a first and a second carbon black material present in a blend in the composition, it is preferred to have a weight percentage ratio of the first carbon black material to the second carbon black material of about 40:60 to about 60:40, and more preferably about 50:50. Also, in a preferred embodiment, the composition comprises about 30 to about 50 parts by weight of such a blend of the first carbon black material and the second carbon black material.

Upon cure, in a preferred embodiment hereof, the resulting cured compositions exhibit no cracking meeting a rating of 0 under the test and rating method of ISO 23936-2:2011 (E)-B.4.2.

It is also preferred that upon curing, for specialty uses in the oil and gas industries, that the durometer of the cured composition is about Shore A Durometer of about 75 to about 95, preferably about 85 to about 95 and more preferably about 90 to about 94 or about 90 to about 92.

The invention also includes molded articles formed by curing the curable rapid gas decompression-resistant fluoroelastomeric compositions herein in a mold, such as by heat curing and/or compression molding. Molded articles may include seals, gaskets and other components, preferably those capable of use in an oilfield and petrochemical end applications. In a further embodiment, the resulting RGD-resistant article is a seal which may have a cross-sectional diameter of up to including about 5.3 mm or higher, and up to about 10 mm or more if desired.

The invention also includes a method of preparing a rapid gas decompression-resistant fluoroelastomeric composition, comprising: (a) providing a curable fluoropolymer comprising a curesite monomer having at least one functional group capable of curing with a peroxide curative; and (b) combining 100 parts by weight of the curable fluoropolymer with about 1.5 to about 3 parts by weight of a bisphenyl-based curative, about 2 to about 5 parts by weight of an organic peroxide curative and about 3 to about 6 parts by weight of an organic peroxide co-curative, each based on 100 parts by weight of the curable fluoropolymer, wherein a ratio of the bisphenyl-based curative to the organic peroxide co-curative of about 0.25:1 to about 1.5:1 and a ratio of the bisphenyl-based curative to the organic peroxide of about 0.5:1 to about 1.5:1.

In a preferred embodiment of the method, the ratio of the bisphenyl-based curative to the organic peroxide co-curative is about 0.4:1 to about 1.2:1 and/or the ratio of the bisphenyl-based curative to the organic peroxide is about 0.60:1 to about 1.4:1. Upon cure, resulting cured composition formed according to the method herein exhibit no cracking and meet a rating of 0 under the test and rating method of ISO 23936-2:2011(E)-B.4.2 and/or exhibit no cracking. Further, upon curing such seals can be made having cross-sectional diameters of up to and including about 5.3 mm and up to and including about 10 mm or greater if desired.

DETAILED DESCRIPTION OF THE INVENTION

A curable rapid gas decompression-resistant fluoroelastomeric composition, as well as method for forming such composition and resulting molded articles are provided herein. The following description is intended to illustrate preferred embodiments of the invention and not to limit the scope of the invention.

The base fluoropolymer used in the invention is preferably a peroxide-curable fluoropolymer that includes a curesite monomer that has at least one functional group capable of being cured by a peroxide curative, and preferably by a peroxide cure system including a peroxide curative and co-curative as are known in the art.

The curable base fluoropolymer herein may be any suitable fluoropolymer, including compositions which are useful in harsher environments such as those encountered in oilfield industrial use or petrochemical processing. The curable fluoropolymers are preferably non-perfluorinated fluoropolymers (FKMs) as such materials are classified by the Standard Rubber Nomenclature definitions provided by ASTM International in ASTM D1418-10a. Standard FKM polymers in accordance with such elastomer nomenclature typically have at least two monomers, one of which is fluorinated, and preferably all of which are fluorinated to some degree, with at least one curesite monomer for use in vulcanization. The at least two monomers preferably include vinylidene fluoride and hexafluoropropylene or a similar fluorinated olefin, but may include a variety of other monomers as well. The fluoroelastomer composition may also include at least one curing agent that is capable of undergoing a crosslinking reaction with a functional group in the curesite monomer(s) of the fluoroelastomer.

Preferably for FKMs herein, such curesite monomer(s) include one curesite monomer which is peroxide curable, and more preferably which includes a functional group comprising a halogenated material, such as Br or I in the curesite functional group.

Such curesite monomers have a reactive functional group to permit cross-linking. While at least two of the monomers in an FKM are preferably hexafluoropropylene (HFP) and vinylidene fluoride (VF2), other typical monomers may be used in addition to these two for forming a variety of fluoropolymers known in the art.

The curable fluoropolymer may be radiation crosslinkable, but is preferably crosslinkable (curable) through a cure system wherein a curing agent(s) is/are added that is/are capable of reacting with a functional group in the curesite monomer for form an elastomeric material. Optionally, at least one of a second curing agent, a co-curing agent, and/or a cure accelerator(s) may be employed as well. The compositions herein may have a single curable fluoropolymer or a combination of at least two curable fluoropolymers, in the form of, for example, a polymer blend, grafted composition or alloy, depending on desired end properties.

The terms "uncured" or "curable," refer to fluoropolymers for use in compositions herein, which have not yet been subjected to crosslinking reactions in any substantial degree such that the material is not yet sufficiently cured for the intended application.

The curable fluoropolymer for the compositions herein may optionally include additional such polymers in blend-like compositions or grafted/copolymerized compositions as noted above. Further, the polymer backbones may include a variety of curesite monomer(s) along the chain to provide one or more different functional groups for crosslinking, however, preferably one of such groups is curable by a peroxide curing system. The compositions may also include curing agents and co-curing agents and/or accelerators to assist in the cross-linking reactions.

One or more curable fluoropolymer(s) may be present in such compositions. Such polymers are themselves formed by polymerizing or co-polymerizing one or more fluorinated monomers. Various techniques known in the art (direct polymerization, emulsion polymerization and/or free radical initiated polymerization, latex polymerization, etc.) can be used to form such polymers.

The fluoropolymer may be formed by polymerizing two or more monomers, preferably one of which is at least partially fluorinated, although fully fluorinated monomers may be used as well. For example HFP and VF2 may be combined with tetrafluoroethylene (TFE) or one or more perfluoroalkyl vinyl ethers (PAVE), or similar monomers along with at least one monomer which is a cure site monomer to permit curing, i.e. at least one fluoropolymeric curesite monomer. A fluoroelastomer composition as described herein may include any suitable standard curable fluoroelastomeric fluoropolymer(s) (FKM) capable of being cured to form a fluoroelastomer, preferably using a peroxide cure system as well as one or more other curing agents as described herein. Examples of suitable curable FKM fluoropolymers include those sold under the trade name Tecnoflon® PL958 available from Solvay Solexis, S.p.A., Italy or other similar fluoropolymers that exhibit RGD resistance when employed in the compositions herein, preferably that are curable by a peroxide cure system. Other suppliers of such materials include Daikin Industries, Japan; 3M Corporation, Minnesota; and E.I. DuPont de Nemours & Company, Inc., Delaware, among others. Such FKM polymers are not fully fluorinated on the backbone of the polymer.

According to the invention it is preferred that two curatives are used, one that is a bisphenyl-based curative and the other of which is a peroxide cure system including an organic peroxide and a co-curative. In the preferred embodiments herein the bisphenyl-based curative cures through VF2 monomer groups preferably adjacent HFP monomer, and the peroxide based cure system cures through reaction with the functional group on the curesite monomer in the fluoroelastomer. Thus it is preferred that the cure site monomers in the FKMs used herein are capable of curing with a peroxide cure system, and that the FKM is also able to be cured using a bisphenyl-based curative(s).

Preferred functional groups in the cure site monomers for reacting with the peroxide cure system include those having halogenated reactive groups, e.g., iodine or bromine, however, additional curesites may be provided to the same or a different cure site monomer such as those that might enhance bisphenyl-based curing as well, for example those that have a nitrogen-containing reactive group, provided that the peroxide curable functional group is also present. Consequently, while the disclosure herein discusses a variety of preferred curatives (also referred to herein as crosslinking agents or curing agents), when additional cure sites known in the art are used, other curatives that are capable of curing such alternative cure sites may also be used in addition to the organic peroxide-based curatives and co-curatives preferred herein.

In yet further embodiments, exemplary cure site monomers include those listed below, most of which are PAVE-based in structure and have a reactive site. Although the polymers may vary, preferred structures are those having the following structure (A):

$$CF_2=CFO(CF_2CF(CF_3)O)_m(CF_2)_n-X^1 \qquad (A)$$

wherein m is 0 or an integer from 1 to 5, n is an integer from 1 to 5 and $X^1$ is preferably a halogenated end group. However, if additional curesite monomers are used in addition to the halogenated end group curesite monomer, $X^1$ may also be a nitrogen-containing group, such as a nitrile or cyano group, a carboxyl groups, or an alkoxycarbonyl groups. Compounds according to formula (A) may be used alone or in various, optional, combinations thereof.

Further examples of cure site monomers according to formula (A) include formulas (1) through (17) below:

$$CY_2=CY(CF_2)_n-X^2 \qquad (1)$$

wherein Y is H or F, n is an integer from 1 to about 8

$$CF_2=CFCF_2R_f^2-X^2 \qquad (2)$$

wherein $R_f^2$ is $(-CF_2)_n-$, $-(OCF_2)_n-$ and n is 0 or an integer from 1 to about 5

$$CF_2=CFCF_2(OCF(CF_3)CF_2)_m(OCH_2CF_2CF_2)_n\\OCH_2CF_2-X^2 \qquad (3)$$

wherein m is 0 or an integer from 1 to about 5 and n is 0 or an integer of from 1 to about 5

$$CF_2=CFCF_2(OCH_2CF_2CF_2)_m(OCF(CF_3)CF_2)_nOCF(CF_3)-X^2 \quad (4)$$

wherein m is 0 or an integer from 1 to about 5, and n is 0 or an integer of from 1 to about 5

$$CF_2=CF(OCF_2CF(CF_3))_mO(CF_2)_n-X^2 \quad (5)$$

wherein m is 0 or an integer from 1 to about 5, and n is an integer of from 1 to about 8

$$CF_2=CF(OCF_2CF(CF_3))_m-X^2 \quad (6)$$

wherein m is an integer from 1 to about 5

$$CF_2=CFOCF_2(CF(CF_3)OCF_2)_nCF(-X^2)CF_3 \quad (7)$$

wherein n is an integer from 1 to about 4

$$CF_2=CFO(CF_2)_nOCF(CF_3)-X^2 \quad (8)$$

wherein n is an integer of from 2 to about 5

$$CF_2=CFO(CF_2)_n-(C_6H_4)-X^2 \quad (9)$$

wherein n is an integer from 1 to about 6

$$CF_2=CF(OCF_2CF(CF_3))_nOCF_2CF(CF_3)-X^2 \quad (10)$$

wherein n is an integer from 1 to about 2

$$CH_2=CFCF_2O(CF(CF_3)CF_2O)_nCF(CF_3)-X^2 \quad (11)$$

wherein n is 0 or an integer from 1 to about 5

$$CF_2=CFO(CF_2CF(CF_3)O)_m(CF_2)_n=X^2 \quad (12)$$

wherein m is 0 or an integer from 1 to about 4 and n is an integer of 1 to about 5

$$CH_2=CFCF_2OCF(CF_3)OCF(CF_3)-X^2 \quad (13)$$

$$CH_2=CFCF_2OCH_2CF_2-X^2 \quad (14)$$

$$CF_2=CFO(CF_2CF(CF_3)O)_mCF_2CF(CF_3)-X^2 \quad (15)$$

wherein m is an integer greater than 0

$$CF_2=CFOCF(CF_3)CF_2O(CF_2)_n-X^2 \quad (16)$$

wherein n is an integer that is at least 1

$$CF_2=CFOCF_2OCF_2CF(CF_3))OCF_2-X^2 \quad (17)$$

wherein $X^2$ can be a monomer reactive site such as a halogen or alkylated halogen group (I or Br, $CH_2I$ and similar alkylated or alkoxylated reactive halogen groups and the like). Such curesite monomers may be at least partially fluorinated or perfluorinated along the portion of the backbone of the cure site monomer that lies in the polymer backbone chain when polymerized, in which case some of the fluorine atoms in the backbone of the example curesite monomers above may be substituted with a hydrogen atom within the scope of the invention.

Fluoropolymers for use in the compositions herein may be synthesized using any known or to be developed polymerization technique for forming fluorine-containing curable fluoropolymers by polymerization, including, for example, emulsion polymerization, latex polymerization, chain initiated polymerization, batch polymerization and others. Preferably, the polymerization is undertaken so that reactive cure sites are located on at least one terminal end of the polymer backbone and/or are depending from the main polymer backbone.

One possible method of making the polymers includes radical polymerization using an initiator such as those known in the art for polymerization of fluorine-containing elastomers (organic or inorganic peroxide and azo compounds). Typical initiators are persulfates, percarbonates, peresters and the like, with preferred initiators being include salts of persulfuric acid, oxidizing carbonates and esters, and ammonium persulfate, with the most preferred being ammonium persulfate (APS). These initiators may be used alone or with reducing agents, such as sulfites and sulfite salts.

Standard polymerization procedures known in the art may be used. The cure-site monomer may be added and copolymerized when preparing the fluorine-containing elastomer. In their uncured or curable state, the fluoroelastomer compositions useful herein preferably include at least one bisphenyl-based curative and an organic peroxide cure system, wherein the two curing systems are capable of undergoing a crosslinking reaction with one of the functional groups of the at least one cure site monomers present on the fluoropolymer(s). In addition, if desired, additional curing agents or combinations of curing agents and co-curing agents may be employed particularly if additional curesite monomers are provided. Cure accelerators may also be used if desired. In the compositions herein, a halogen-containing functional group as noted above reacts with the organic peroxide curing agent and/or co-curing agent in the peroxide cure system and also with the bisphenyl-based curative to form a cured fluoroelastomer composition which may be molded into a finished article.

When using a peroxide cure system, in an FKM fluoropolymer suitable curable fluoropolymers include polymers of VF2, HFP, and cure site monomers having a fluorinated structure with a peroxide-curable functional group, such as, for example, halogenated alkyl and other derivatives, and partially- or fully-halogenated hydrocarbon groups as noted above.

Curing agents for peroxide-based cure systems may be any organic peroxide curing agent and/or co-curing agent known or to be developed in the art, such as organic and dialkyl peroxides or other peroxides capable of generating radicals by heating and engaging in a cross-linking reaction with the functional group(s) of a curesite monomer on the fluoropolymer chain. Exemplary dialkylperoxides include di-tertbutyl-peroxide, 2,5-dimethyl-2,5-di(tertbutylperoxy) hexane; dicumyl peroxide; dibenzoyl peroxide; ditertbutyl perbenzoate; and di-[1,3-dimethyl-3-(tertbutylperoxy)butyl]-carbonate. Other peroxidic systems are described, for example, in U.S. Pat. Nos. 4,530,971 and 5,153,272, incorporated in relevant part with respect to such curing agents by reference.

Co-curatives for such peroxide curing agents typically include allyl compounds such as isocyanurates and similar compounds that are polyunsaturated and work with the peroxide curing agent to provide a useful cure, such as, for example, triallyl cyanurate (TAC); triallyl isocyanurate (TRIC); tri(methallyl)isocyanurate (TMAIC); tris(diallylamine)-s-triazine; triallyl phosphite; N,N-diallyl acrylamide; hexaallyl phosphoramide; N,N,N',N'-tetraalkyl tetraphthalamide; N,N,N',N'-tetraallyl malonamide; trivinyl isocyanurate; 2,4,6-trivinyl methyltrisiloxane; and tri(5-norbornene-2-methylene)cyanurate. The most preferred is well known in the art is triallyl isocyanurate (TRIC) which is sold under trade names such as DIAK®, e.g. DIAKO #7, and TAICO, including TAICO DLC.

As a bisphenyl-based curing agent, bisphenyl-based materials and their derivatives may be used, and preferably a curative such as Bisphenol A, Bisphenol AF, BOAP, bisaminothiophenols, bisamidoximes, and/or bisamidrazones is used. However, additional curatives such as, monoamidines and monoamidoximes, tetraphenyltin, triazines, cyanogroup containing nitrile curatives, organometallic compounds and their hydroxides, especially organotin compounds, including ally-, propargyl-, triphenyl- and allenyl tin, curing agents containing amino groups such as diamines and diamine carbamates, such as N,N'-dicinnamylidene-1, 6-hexanediamine, trimethylenediamine, cinnamylidene, trimethylenediamine, cinnamylidene ethylenediamine, and cinnamylidene hexamethylenediamine, hexamethylenediamine carbamate, bis(4-aminocyclohexly)methane carbamate, 1,3-diaminopropane monocarbamate, ethylenediamine carbamate, trimethylenediamine carbamate, and curatives as described in U.S. Pat. Nos. 7,521,510 B2, 7,247,749 B2 and 7,514,506 B2, each of which is incorporated herein in relevant part with respect to the listing of various curatives for cyano-group containing fluoropolymers and the like may be used in addition to the bisphenyl-based curative and the peroxide-based curing system if desired and/or if additional curesite monomers are provided that are curable by such agents.

Bisphenyl-based curatives and derivatives thereof, including BOAP, Bisphenol A, Bisphenol AF and their salts and derivatives, bisaminothiphenols, and parabenzoquinone dioxime (PBQD) are preferably used in combination with the peroxide curing system. In addition to these curatives, other bisphenyl-based curatives and their derivatives as described in U.S. Pat. Nos. 7,247,749 and 7,521,510, incorporated in relevant part with respect to such compounds maybe used. Regardless of the type of bisphenyl-based curative used, it is most preferred that the compound have at least one and preferably two hydroxyl-containing functional reactive curesites for reacting with the curesite monomers herein.

Each of the at least one cure site monomers in each of the curable fluoropolymers herein is preferably present in an amount of about 0.01 to about 10 mole percent respectively. The peroxide curative and co-curative and the bisphenyl-based curative are preferably collectively present (as with any additional curatives used) in a total amount of about 0.01 to about 10 parts by weight per 100 parts by weight of the fluoropolymers in the composition It is preferred that within the fluoroelastomeric composition, the ratio of the bisphenyl-based curative to the organic peroxide co-curative such as TAIC and the like is about 0.25:1 to about 1.5:1, preferably about 0.4:1 to about 1.2:1, and most preferably about 0.5:1 to about 1:1. Further, it is preferred that the ratio of the bisphenyl-based curative to the organic peroxide in the organic peroxide curing system is about 0.5:1 to about 1.5:1, preferably about 0.6:1 to about 1.4:1, and most preferably about 0.65:1 to about 1.3:1.

The RGD-resistant fluoropolymeric composition herein may further comprise at least one compound additive, for example, at least one carbon black material(s), at least one zinc oxide compound(s), and a dispersant, such as, for example, an organosiloxane. The preferred fillers/additives preferably make up no greater than about 80 parts by weight per 100 parts by weight of the curable base fluoropolymer(s) in the RGD-resistant composition, preferably about 20 parts to about 75 parts, and more preferably about 30 parts to about 50 parts.

Carbon black materials may be used alone or in combination for varying end effects and may range in quality depending on end use from standard carbon blacks to specialty carbon blacks of varying porosity and purity, including higher purity or ultra-high purity carbon black. Suitable carbon blacks are available from Cabot Corporation and Cancarb Corporation. It is preferred to use at least a first carbon black material and a second carbon black material, which may be the same or different, but are preferably different. When using two carbon black materials in a blend, it is preferred that they are present in a total amount of about 20 to about 60 parts by weight, and more preferably about 30 to about 50 parts by weight based on 100 parts by weight of the curable base fluoropolymer(s) in the composition, and that the ratio between the two carbon blacks is from about 40:60 to about 60:40 and more preferably about 50:50.

Zinc oxide compounds are also known for fluoropolymer use and commercially acceptable additives may be obtained from Horsehead Corporation under the trade name, Kadox®. If desired, dispersants or processing aids may be used, for example organosiloxanes available for fluoropolymer compositions from Strucktol.

In preferred embodiments herein, the composition preferably comprises a base of 100 parts by weight of at least one curable fluoropolymer or combination thereof. Based on the 100 phr of the fluoropolymer(s) in the base fluoropolymer, a preferred composition includes from about 1.5 to about 3 parts by weight of the bisphenyl-based curative. The organic peroxide is preferably present in an amount of about 2 to about 5 parts by weight, and preferably about 2.3 to about 4.6 parts by weight. The co-curative for the peroxide cure system is preferably present in an amount of about 3 to about 6 parts by weight. The composition also preferably includes up to about 60 parts by weight of at least one carbon black material, and preferably about 20 to about 60 parts by weight of total carbon black material, most preferably about 30 to about 50 parts carbon black, and even more preferably about 40 parts carbon black. As noted above, the carbon black in one preferred embodiment includes a blend of two or more differing types of carbon black material. The composition may also include 0 up to about 15 parts by weight of a zinc oxide compound, preferably about 3 to about 5 parts of zinc oxide compound, and most preferably about 5 parts zinc oxide compound. If used, a dispersant is preferably present in an amount up to about 3 parts by weight of a dispersant, preferably about 0.5 to about 1.0 part by weight and most preferably about 0.5 parts by weight.

Other additional additives may be used as are known in the art or to be developed, preferably for use in RGD-resistant compositions, may be used, including, cure accelerators, other co-curatives in addition to the co-curative for the organic peroxide cure system, processing aids, plasticizers, other fillers and modifiers such as silica, other fluoropolymers (such as TFE and its melt-processible copolymers as well as core-shell modified fluoropolymers as are known in the art in micropowder, pellet, fiber and nanopowder forms), fluorographite, barium sulfate, carbon fluoride, clay, talc, metallic fillers (titanium oxide, aluminum oxide, yttrium oxide, silicon oxide), metal carbides (silicon carbide, aluminum carbide), metallic nitrides (titanium nitride, silicon nitride, aluminum nitride), other inorganic fillers (aluminum fluoride, carbon fluoride), colorants, organic dyes and/or pigments, such as azo, isoindolenone, quinacridone, diketopyrrolopyrrole, anthraquinone, and the like, imide fillers (such as polyimide, polyamide-imide and polyetherimide), ketone plastics (such as polyarylene ketones like PEEK, PEK and PEKK), polyarylates, polysulfones, polyethersulfones, polyphenylene sulfides, polyoxybenzoate, and the like may be used in amounts known in the art and/or which may be varied for different properties. All of the fillers herein may be used alone or in combinations of two or more such fillers and additives. Preferably, any such optional additional fillers, if used, total less than about 20 parts per 100 parts base fluoropolymer(s) in addition to the preferred fillers noted above.

RGD curable compositions herein may be cured using any preferred curing technique known in the art. For FKM-type curable fluoropolymers, the compositions are preferably cured at temperatures of about 160° C. to about 200° C. for about 10 to about 60 minutes, with post-curing at about 200° C. to about 260° C. in an oven for varying periods of time depending on the material and desired degree of cross-linking. It will be understood to those skilled in the art, based on this disclosure that a variety of curing techniques may be employed and may vary depending on the preferred base curable fluoropolymer and curative(s) chosen, provided that the base curable fluoropolymer(s) of the composition are at least partially cured during the primary curing cycle, and preferably are substantially completely cured, with further curing, if desired completed in post-curing. Curing operations may be done by standard hot press techniques using metallic molds within a heated press under desired conditions, with post-curing in an oven, however, other techniques may also be used.

Upon cure, in a preferred embodiment hereof, the resulting cured compositions exhibit no cracking meeting a rating of 0 under the test and rating method of ISO 23936-2:2011 (E)-B.4.2.

It is also preferred that upon curing, for specialty uses in the oil and gas industries, that the durometer of the cured composition is about Shore A Durometer of about 75 to about 95, preferably about 85 to about 95, and more preferably about 90 to about 94 or about 90 to about 92, although the durometer may be varied based on the desired end use.

The invention also includes molded articles formed by curing the curable rapid gas decompression-resistant fluoroelastomeric compositions herein in a mold, such as by heat curing and/or compression molding as described above. The parts may be formed so as to have a cross-sectional diameter or thickness that is small (i.e., less than about 5.3 mm) or may be formed so as to be approaching and up to about 5.3 mm in size as well, and in other embodiments, if desired may be formed up at sizes up to and including about 10 mm or even more in thickness or cross-sectional diameter, depending on the desired end application, while still retaining RGD-resistant properties.

Molded article may includes seals, such as O-rings, gaskets, inserts and the like, but other components in various shapes and sizes and for uses known or to be developed in the art are contemplated herein, preferably end uses capable of being employed in an oilfield end application or a petrochemical processing end applications where RGD issues may arise making the compositions especially useful and indicated for such end applications. Examples of oil field end applications include seals and o-rings for compressors, pumps, instruments and other down hole tools and oilfield applications wherein parts and components encounter long soak times in high pressure gases such as carbon dioxide and/or methane and/or are subject to extreme temperatures (high and low) and pressures, as well as rapidly changing temperature and pressure conditions that may cause gas disruption and RGD issues.

In preparing a rapid gas decompression-resistant fluoroelastomeric composition herein the components as noted above are typically combined by providing a curable fluoropolymer(s) herein and then adding to the base fluoropolymer(s) the bisphenyl-based curative, the organic peroxide curative and the organic peroxide co-curative in the desired amounts along with any other preferred or optional additives by any suitable mixing technique. For example, the components may be mixed or blended by any conventional means or apparatus, including with two-roll mills and internal mixers. For example, the composition may be blended using an internal mixer such as those commercially available from Banbury, C.W. Bradender Instruments, Inc. of Hackensack, N.J. and from Morijama of Farmingdale, N.Y. Preferably, the curative(s) and co-curative(s) of the invention and any optional cure accelerators are added after other ingredients and additives as desired are blended. However, it should be understood based on this disclosure that the order in which such materials are provided is not limiting the scope of the invention.

The invention will now be described with respect to the following non-limiting examples.

Example 1

Test samples were made having a cross-sectional thickness of about 10 mm, which is considered a higher cross-sectional diameter than is normally associated with RGD-resistant compositions were prepared. The samples were soaked for about 48 hours at 150 bar pressure at varying temperatures (high and low) of about 40° C. and 180° C. After releasing pressure, at a decompression rate of about 20 bar per min., the specimens were tested inspected in an uncompressed state. The test samples included as a Comparative Example A which was a commercially available RGD material from Greene, Tweed & Co., Inc. of Kulpsville, Pa. sold as FKM 938 for ROD resistance in the oil field and petrochemical industries. This test sample was based on a fluoroelastomer composition having a single, peroxide cure system, carbon black, zinc oxide, and other elastomer additives.

Experimental Examples B-G were formulated using as a base elastomer commercially available fluoroelastomer, Technoflon® PL958 from Solvay Solexis, and were prepared having the formulations set forth in Table 1 below, wherein the amount of component is measured as its weight expressed in parts per hundred. based on 100 parts of base fluoroelastomer. The formulations were blended and cured in the same manner and in accordance with the parameters set forth above, and included a carbon black 990 from Cancarb and a carbon black N100 Vulcan 9 from Cabot Corporation as fillers along with Kadox zinc oxide from Horsehead Corporation, siloxane dispersant. Two curatives were used, both a bisphenol curative and a peroxide curing system based on an organic peroxide and peroxide co-curative (triallylisocyanurate (TAIC) and Varox (2,5-dimethyl-2,5-Di-(tbutylperoxy) hexane)). The bisphenol curative used was a commercial product VC-30 which is available as a 50% bisphenol in an FKM.

TABLE 1

| Component | Ex. B | Ex. C | Ex. D | Ex. E | Ex. F | Ex. G |
|---|---|---|---|---|---|---|
| FKM | 100.00 | 100.00 | 100.00 | 100.00 | 100.00 | 100.00 |
| N990 Carbon Black | 30.00 | 20.00 | 30.00 | 30.00 | 30.00 | 30.00 |
| N100 Vulcan 9 | 25.00 | 20.00 | 25.00 | 25.00 | 25.00 | 25.00 |
| Zinc Oxide | 5.00 | 5.00 | 5.00 | 5.00 | 5.00 | 5.00 |
| Organic Siloxane Dispersant | 0.50 | 0.50 | 0.50 | 0.50 | 0.50 | 0.50 |
| 50% Bisphenol | 6.00 | 6.00 | 6.00 | 3.00 | 6.00 | 3.00 |
| Peroxide | 2.30 | 2.30 | 2.30 | 2.30 | 4.60 | 2.30 |
| Co-Curative (TAIC | 6.00 | 6.00 | 3.00 | 6.00 | 6.00 | 3.00 |

As noted in the Background hereof, FKM 938 (Comparative Example A) in standard ROD O-ring sizes meets ISO and NORSOK M710 standards generally with a good 1 or 2 rating. Each of the inventive Examples B-G demonstrated a passing ROD rating on a large size thickness in an uncompressed sample of passing. Examples B-D each passed with an average of a 0 rating for all cycles. Examples E-F each passed with an average of a 2 rating for all cycles, and Example G passed with a rating of 3 for all cycles. The Examples all had suitable mechanical properties, and varying Durometer Shore A hardness. Each of the Examples had a Shore A Durometer of 90-92 with Example C having a durometer closest to 90.

These results are especially significant considering the thickness of the Examples and the uncompressed nature of the test used. It can thus be seen that the invention provides a beneficial composition for RGD-resistance that is suitable for oilfield and other uses, such as aerospace compounds, petrochemical industry uses and the like depending on the polymer base materials and formulations employed.

Example 2

Tests were conducted in a media prepared using a 95/5 mixture of methane and carbon dioxide gas at a pressure of 150 bar (2175 psi). The temperature of the test was 180° C. (356° F.). The release rate was 100 bar/min (1450 psi/min). The samples included a 48 hour initial soak and a total of 25 decompression cycles. A first sample tested (Example H) had a base FKM, Tecnoflon PL 958 polymer (FKM 1), and included an ultrapure carbon N990 from Thermax®, a Vulcan® 9-N-110 carbon black, Kadox® zinc oxide, an organic processing aid, a peroxide curative (Varox® DBPH-50) and a TAIC co-curative and VC-30 Viton® bisphenol curative (50%). See Table 2. Example I used an alternate brand of a clean carbon black from Orion®, but otherwise included the same ingredients. All samples passed with a 0 to 2, with the exception of four samples which ranked a 3. Example J substituted an N990 carbon black in place of clean carbon black. All samples passed with a 1 or 0 ranking Example K substituted a Viton® GFLT 600S FKM (FKM 2) for the Tecnoflon used in Examples H-J. All samples passed with 0 rankings A Comparative Sample (B) was also tested based on FKM 938 which passed the Norsok M710 testing. Having samples with only a single peroxide cure system even with two different carbon blacks resulted in results averaging 1 to 3.

TABLE 2

| Component | Ex. H | Ex. I | Ex. J | Ex. K |
|---|---|---|---|---|
| FKM 1 | 100 | 100 | 100 | — |
| FKM 2 | — | — | — | 100 |
| N990 Clean Carbon Black | 20 | 20 | — | 20 |
| N990 Carbon Black | — | — | 20 | — |
| N110 Vulcan 9-N | 20 | 20 | 20 | 20 |
| Zinc Oxide | 5 | 5 | 5 | 5 |
| Organic Dispersant | 0.5 | 0.5 | 0.5 | 0.5 |
| 50% Bisphenol | 6 | 6 | 6 | 6 |
| Peroxide | 2.3 | 2.3 | 2.3 | 2.3 |
| Co-curative (TAIC) | 6 | 6 | 6 | 6 |

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A curable rapid gas decompression-resistant fluoroelastomeric composition, comprising
    a curable fluoropolymer comprising a curesite monomer having at least one functional group capable of curing with a peroxide curative;
    a bisphenyl-based curative; and
    an organic peroxide curative and an organic peroxide co-curative, wherein the fluoroelastomeric composition has a weight ratio of the bisphenyl-based curative to the organic peroxide co-curative of about 0.25:1 to about 1.5:1 and a weight ratio of the bisphenyl-based curative to the organic peroxide curative of about 0.5:1 to about 1.5:1.

2. The curable rapid gas decompression-resistant fluoroelastomeric composition according to claim 1, wherein the curable fluoropolymer further comprises vinylidene fluoride as a monomer.

3. The curable rapid gas decompression-resistant fluoroelastomeric composition according to claim 2, wherein the curable fluoropolymer further comprises hexafluoropropylene as a monomer.

4. The curable rapid gas decompression-resistant fluoroelastomeric composition according to claim 1, wherein the bisphenyl-based curative comprises bisaminophenol.

5. The curable rapid gas decompression-resistant fluoroelastomeric composition according to claim 1, wherein the organic peroxide co-curative is an allyl compound.

6. The curable rapid gas decompression-resistant fluoroelastomeric composition according to claim 5, wherein the allyl compound is triallylisocyanurate.

7. The curable rapid gas decompression-resistant fluoroelastomeric composition according to claim 1, wherein the weight ratio of the bisphenyl-based curative to the organic peroxide co-curative is about 0.4:1 to about 1.2:1 and the weight ratio of the bisphenyl-based curative to the organic peroxide curative is about 0.6:1 to about 1.4:1.

8. The curable rapid gas decompression-resistant fluoroelastomeric composition according to claim 1, wherein the composition further comprises at least one compound additive.

9. The curable rapid gas decompression-resistant fluoroelastomeric composition according to claim 8, wherein the compound additive is selected from the group consisting of at least one carbon black material, at least one zinc oxide compound, and a dispersant.

10. The curable rapid gas decompression-resistant fluoroelastomeric composition according to claim 9, wherein the dispersant is an organosiloxane.

11. The curable rapid gas decompression-resistant fluoroelastomeric composition according to claim 9, wherein the compound additives comprise no greater than about 80 parts by weight per 100 parts by weight of the curable fluoropolymer.

12. The curable rapid gas decompression-resistant fluoroelastomeric composition according to claim 1, comprising 100 parts by weight of the curable fluoropolymer and, based on the 100 parts by weight of the curable fluoropolymer:
    about 1.5 to about 3 parts by weight of the bisphenyl-based curative;
    about 2 to about 5 parts by weight of the organic peroxide curative;
    about 3 to about 6 parts by weight of the organic peroxide co-curative;
    up to about 60 parts by weight of at least one carbon black material;

up to about 15 parts by weight of a zinc oxide compound; and up to about 3 parts by weight of a dispersant.

13. The curable rapid gas decompression-resistant fluoroelastomeric composition according to claim 12, wherein the composition comprises, based on 100 parts by weight of the curable fluoropolymer:

about 2.3 to about 4.6 parts by weight of the organic peroxide curative;

about 20 to about 60 parts by weight of a blend of a first carbon black material and a second carbon black material;

about 3 to about 5 parts by weight of the zinc oxide compound; and about 0.5 to 1.0 parts by weight of the dispersant.

14. The curable rapid gas decompression-resistant fluoroelastomeric composition according to claim 13, wherein there the first and the second carbon black materials are present in a blend having a weight percentage ratio of the first carbon black material to the second carbon black material of about 40:60 to about 60:40.

15. The curable rapid gas decompression-resistant fluoroelastomeric composition according to claim 14, wherein the weight percentage ratio of the first carbon black material to the second carbon black material is 50:50.

16. The curable rapid gas decompression-resistant fluoroelastomeric composition according to claim 13, wherein the composition comprises about 30 to about 50 parts by weight of the blend of the first carbon black material and the second carbon black material.

17. The curable rapid gas decompression-resistant fluoroelastomeric composition according to claim 13, wherein the weight ratio of the bisphenyl-based curative to the organic peroxide co-curative is about 0.25:1 to about 1.5:1 and the weight ratio of the bisphenyl-based curative to the organic peroxide curative is about 0.5:1 to about 1.5:1.

18. The curable rapid gas decompression-resistant fluoroelastomeric composition according to claim 1, wherein upon cure, the resulting cured composition exhibits no cracking meeting a rating of 0 under the test and rating method of ISO 23936-2:2011(E)-B.4.2.

19. The curable rapid gas decompression-resistant fluoroelastomeric composition according to claim 1, wherein upon curing, the durometer of the composition is about Shore A Durometer of about 75 to about 95.

20. The curable rapid gas decompression-resistant fluoroelastomer composition according to claim 19, wherein upon curing, the durometer of the composition is about Shore A Durometer of about 90 to about 94.

21. A molded article formed by curing the curable rapid gas decompression-resistant fluoroelastomeric composition according to claim 1 in a mold.

22. The molded article according to claim 21, wherein the article is a seal or a gasket.

23. The molded article according to claim 22, wherein the article is a seal having a cross-sectional diameter of at least about 5.3 mm.

24. The molded article according to claim 23, wherein the cross-sectional diameter is up to about 10 mm.

25. The molded article according to claim 21, wherein the article is capable of use in an oilfield end application.

* * * * *